No. 890,117. PATENTED JUNE 9, 1908.
J. T. AUSTIN.
CENTRIFUGAL BLOWER.
APPLICATION FILED NOV. 30, 1906.
2 SHEETS—SHEET 1.
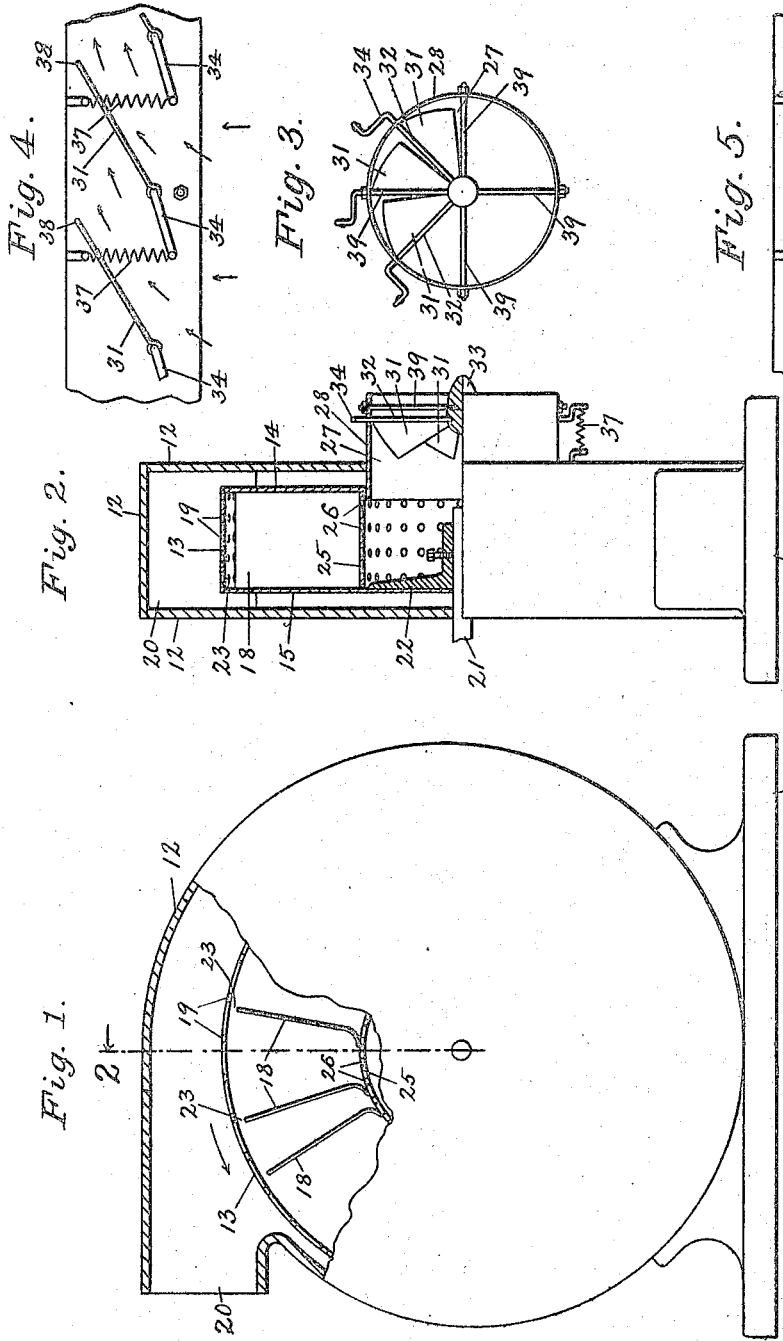
Witnesses:
H. Mallney
Joseph Merritt
Inventor:
John T. Austin,
By W. H. Honiss, Atty.

No. 890,117.   
J. T. AUSTIN.  
CENTRIFUGAL BLOWER.  
APPLICATION FILED NOV. 30, 1906.

PATENTED JUNE 9, 1908.

Witnesses:  
H. Mallner  
Joseph Merritt

Inventor:  
John T. Austin.  
By W. H. Honiss, Atty

UNITED STATES PATENT OFFICE.

JOHN T. AUSTIN, OF HARTFORD, CONNECTICUT, ASSIGNOR TO AUSTIN ORGAN COMPANY, OF HARTFORD, CONNECTICUT, A CORPORATION OF MAINE.

CENTRIFUGAL BLOWER.

No. 890,117.  Specification of Letters Patent.  Patented June 9, 1908.

Application filed November 30, 1906. Serial No. 345,587.

*To all whom it may concern:*

Be it known that I, JOHN T. AUSTIN, a citizen of the United States, and resident of Hartford, in the county of Hartford and State of Connecticut, have invented certain new and useful Improvements in Centrifugal Blowers, of which the following is a full, clear, and exact specification.

This invention relates to centrifugal blowers, and consists of an improved construction whereby the efficiency of the blower is increased, while the noise usually made by this type of blower is greatly diminished.

The invention is here shown applied to a blower for use in connection with pipe organs, as it is in this connection that the invention finds one of its most useful applications.

Figure 7:
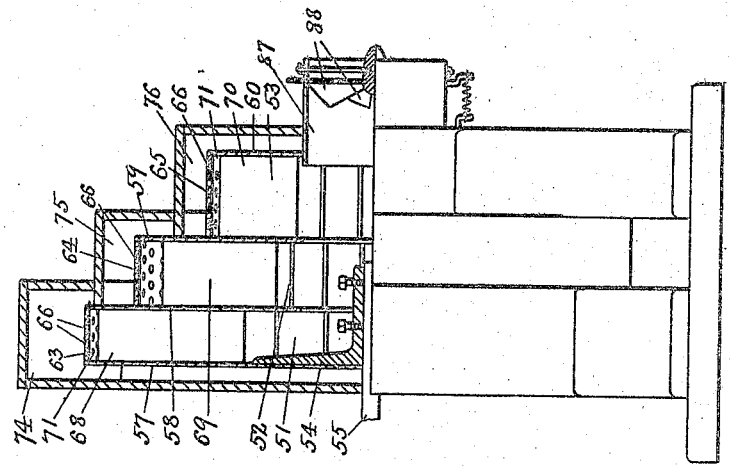
Figure 6:
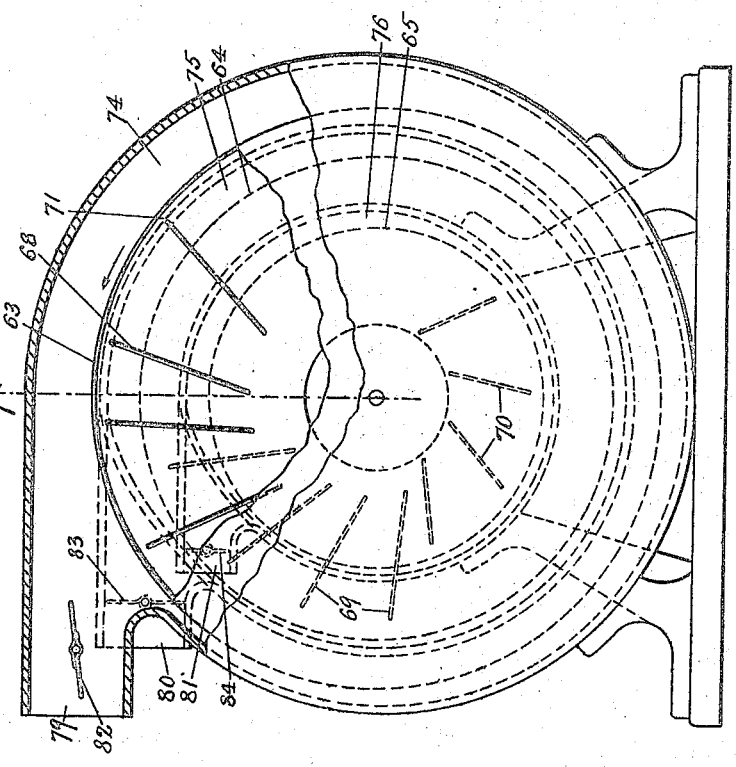

Figure 1 is a side view of a single blower embodying this invention. Fig. 2 is an end view partly in section on the line 2 of Fig. 1. Fig. 3 is an end view of the intake. Figs. 4 and 5 are diagrams showing the development of a part of the intake as seen from the top, Fig. 4 showing the shutters in a partly open condition, and Fig. 5 showing them closed. Fig. 6 is a side view of a multiple blower embodying this invention, and Fig. 7 is a side view of Fig. 6 shown partly in section on the line 7 of Fig. 6.

The blower is secured upon a base 11 and has a casing 12 which surrounds the outer rim 13 of the blower wheel and is located eccentrically thereto in the usual manner. The blower wheel consists of two circular plates 14 and 15 forming side walls which are joined at their outer edges by the rim 13. Blades 18 of the usual form and preferably unequally spaced are located between the side plates 14 and 15, a space 23 being preferably left between the outer end of each blade and the rim 13. The outer rim 13 is pierced with holes 19 to permit the exit of the air from the interior of the wheel into the casing whence it is discharged through the opening 20 (Fig. 1). The wheel is mounted for rotation upon the shaft 21 by means of a flanged hub 22 secured to the shaft and to the wall 15. Motion may be imparted to the shaft 21 in any suitable manner. An inner rim 25 extends between the plates 14 and 15 at the inner ends of the blades and is provided with perforations 26, through which the air passes from the intake passage 27 to reach the interior of the wheel.

The intake passage 27 is of circular form and is inclosed by the casing 28. The outer end of the passage is provided with a number of sector-shaped deflector wings 31, each of which is secured along one edge to a radially disposed shaft 32. The inner end of each shaft 32 is journaled in the hub 33 while the outer end extends through the casing 28 and has a crank 34 on its outer end by which the shaft may be turned to open or close the wing. Each crank 34 has a spring 37 connected with its outer end, which tends to keep the wing in its closed position, at which time the free edge 38 of each wing preferably rests against the shaft of the wing next it as shown in Fig. 5. In the construction shown, the hub 33 is suspended in place by the four spokes 39, which are secured at their inner ends to the hub and at their outer ends to the intake casing 38. The swinging ends of the wings point in the general direction of rotation of the blades 18, so as to deflect the entering air in that direction when the wings are opened.

When the wheel is at rest or when the discharge passage 20 is closed so that the blower is delivering no air, the action of the springs 37 will keep the wings 31 closed. As soon, however, as the motion of the wheel and the opening of the discharge passage 20 creates a suction in the intake passage 27, the pressure of the entering air will force the wings 31 open more or less, according to the amount of air being discharged through the passage 20. As the air enters the intake passage 27 it strikes the wings 31 and is by them deflected sidewise and given a whirling motion around the axis of the wheel, in the direction of rotation of the wheel, so that it enters the wheel with a motion which approximates more or less the motion which is subsequently given it by the blades 18. This whirling motion given to the entering air by the blades 31 greatly diminishes the noise made by the blower, since it is the beating of the blades of the wheel against the entering air which appears to be the cause of the noise made by blowers of ordinary construction when running at a high rate of speed. The smaller the quantity of air which is being discharged from the passage 20, the less the wings 31 will stand open, and the more therefore will the air be deflected sidewise, in entering. Therefore the smaller the quantity of air delivered the less noise made by the blower. This is important in the case of church organs, since it is when the organ is playing softly that the blower should be nearest noiseless, a result which is secured by this arrangement, because the smaller quantity of air required for playing the organ softly is deflected by the nearly closed position of the wings into a close approximation of the rotary movement of the blades 18. The unequal spacing of the blades 18 as shown in Fig. 1, is thought also to assist in reducing the noise. Each blade expels an amount of air different from that expelled by the blades on either side of it and the regularity of the impulses is thus broken up and their rhythmical character destroyed.

In Figs. 6 and 7 is shown a multiple blower constructed to deliver air at any one of three different pressures. The blower contains three wheels 51, 52 and 53, of large, medium, and small diameter respectively, joined together to form an integral structure secured by means of the hub 54 to the shaft 55. The three wheels are made up of the side plates 57, 58, 59 and 60, and the outer rims 63, 64 and 65, the plates 58 and 59 forming walls common to adjoining wheels. The rims 63, 64, and 65 are provided with perforations 66 and the wheels are provided with blades 68, 69 and 70, which are preferably spaced unequally as shown, and located so as to leave a space 71 between each blade and its corresponding outer rim. The wheels are surrounded by a casing which is formed so as to inclose the periphery of each rim 63, 64 and 65, by separate chambers 74, 75 and 76, having no communication with each other, and provided with discharge passages 79, 80 and 81, (Fig. 6) having valves 82, 83 and 84 by which the passages may be independently opened and closed. A single intake passage 87 is provided for the three wheels and this passage is provided with shutters 88 of similar construction to those described in connection with the single blower shown in Figs. 1—5.

As the pressure under which air is discharged from a blower depends, other things being equal, upon the velocity of the wheel, it is obvious that at a given velocity the air discharged through the perforated rim 63 will be delivered at a greater pressure than that discharged through the rim 64. In the same way, the air discharged through the rim 64 will be delivered at a higher pressure than that discharged through the rim 65. If therefore the valves 83 and 84 are closed air at a high pressure will be delivered through the discharge passage 79. If the valves 82 and 84 are closed, air at a medium pressure will be discharged through the passage 80, and similarly if the valves 82 and 83 are closed air at a comparatively low pressure will be delivered through the passage 81. In this way three different pressures may be obtained at will from the same blower running at a uniform velocity, by properly manipulating the valves of the three discharge openings. At such times the air in those wheels of which the discharge openings are closed, simply whirls round and round within the wheel without passing out of the rim, after the air in the surrounding chamber has attained a certain pressure, depending on the velocity of the wheel. The air that enters the intake passage 87 therefore will pass only to the interior of that wheel having the open discharge passage. If the discharge passages are all closed no air will be drawn through the intake passage after the pressure in the chambers and in the wheels has been equalized. The springs will then close the shutters.

In the multiple blower the outer rims are preferably made narrower for the larger and higher speed wheels than for the smaller and slower speed ones, since, for a given area of rim surface, the larger the diameter of the rim, the smaller may be its width. Obviously, the number of wheels may be more or less than three, according to the number of pressures desired, and by properly grading the sizes of these wheels, any predetermined pressures and quantities of air may be obtained.

While the inner perforated rim is thought to assist in reducing the noise of the blower, it is not a necessity and hence is not shown in Figs. 6 and 7. The perforations in both the outer and inner rims are preferably made irregular both as to size and location, the important point being that the combined area of perforations shall be great enough to permit the passage of the maximum amount of air which the blower is intended to discharge.

In order that the blades 18 of the rotating member may be spaced unequally without throwing the fan member out of balance, it is preferable to employ an even number of blades. It is then only necessary to dispose the blades in pairs, the two members of each pair being diametrically opposite to each other. It is then immaterial how regularly or otherwise the different pairs of blades are spaced from each other around the fan member, so far as balance is concerned.

The deflecting wings 31 operate to prevent the return flow of air from the reservoir or wind chest, through the blower, in case the action of the latter should be lessened or stopped altogether, in which case the wings would automatically move to their closed position, thus holding the pressure, or at least preventing its immediate escape.

The spaces 23 and 71 between the outer ends of the blades and the adjacent perforated annular rims allow the air to flow past the ends of the blades from one wheel chamber to another, to a sufficient extent to approximately equalize the pressure in those chambers, thus lessening the tendency to irregular puffy action, and thereby to that extent reducing one of the factors tending to produce a noise.

I claim as my invention:

1. A blower, having in combination a casing, and a rotary fan member within the casing provided with blades disposed in an annular space in the casing and an annular wall perforated for admitting the air to the blades.

2. A centrifugal blower having in combination a casing, and a fan member mounted for rotation in the casing, including an annular blade chamber provided with walls for excluding the air at the lateral sides of the blade chamber, and having a perforated wall for admitting the flow of air to the chamber outwardly from the center of rotation.

3. In a centrifugal blower, the combination of a casing, a pair of side plates revolving within the casing, blades secured between and joining the side plates and a perforated inner rim revolving with the side plates and provided with perforations for admitting the air to the blades.

4. In a centrifugal blower, the combination of a casing, a pair of side plates, a perforated rim joining the outer edges of the side plates, and blades carried by the plates and extending outwardly towards the said rim, but having a space between the outer ends of the blades and the perforated rim.

5. In a centrifugal blower, the combination of a casing, a pair of side plates rotating within the casing, blades secured between and rotating with the side plates, the said blades being spaced unequally around the axis of rotation.

6. A blower having in combination a variable air inlet, and means controlled by the variations in the flow of air through the inlet for correspondingly varying the size of the inlet.

7. A blower having in combination a variable air inlet, and means for yieldingly closing the inlet against the pressure of the entering air.

8. A blower having in combination with its air inlet means yieldingly closing the inlet, for admitting inward flow of air to the blower and preventing backward flow of air from the blower.

9. A blower having in combination a variable air inlet including a plurality of wings mounted to open and close the inlet, and resilient means for yieldingly pressing the wings toward their closed position, to admit air to the blower, and to prevent a backward flow of air from the blower.

10. A rotary blower having in combination an air inlet, and means controlled by the variations in the flow of air through the inlet, for automatically varying and deflecting the entering air in the direction of rotation of the blower.

11. A rotary blower having in combination an air inlet, and means controlled by the variations in the flow of air through the inlet for deflecting the entering air in the direction of rotation of the blower, to varying extents, in inverse ratio to the volume of flow.

12. A rotary blower having in combination an air inlet and a movable wing located in said inlet at an angle to the direction of movement of the entering air for deflecting the air in the direction of rotation of the blower.

13. In a rotary blower, the combination of an intake passage for the air, a movable deflecting wing located in said passage and opening at an angle to the direction of movement of the entering air, and resilient means yieldingly supporting the wing against the pressure of the entering air.

14. In a centrifugal blower the combination of an intake passage for the air, a deflecting wing mounted for swinging movement in said passage, and resilient means for swinging the wing against the pressure of the entering air to deflect the air in the direction of rotation of the blower in inverse relation to that pressure.

15. In a rotary blower the combination of an intake passage for the air, a plurality of deflecting wings mounted for swinging movement in said passage at an angle to the entering movement of the air, and resilient means for swinging the wings against the pressure of the air to deflect it in the direction of rotation of the blower.

16. In a centrifugal blower, the combination of an intake passage for the air, a set of radially-disposed wings in the passage, and resilient means tending to close the wings against the pressure of the air entering the passage.

17. In a centrifugal blower, the combination of an intake passage of substantially circular cross section, a set of radially disposed wings in the passage, radially disposed pivots for the wings, and resilient means tending to close the wings against the pressure of the entering air.

18. The combination of a plurality of centrifugal blowers of different diameters mounted to rotate side by side, an intake common to all the blowers, and means for independently closing the discharge passages of the blowers.

19. The combination of a plurality of centrifugal blowers of different diameters secured together, an intake common to all the blowers, and means for independently closing the discharge passages of the blowers.

20. The combination of a plurality of centrifugal blowers of different diameters secured side by side, an intake common to all the blowers, non-communicating casings surrounding the peripheries of the blowers, and means for independently closing the discharge passages of the casings.

21. The combination of a plurality of centrifugal blowers of different diameters, one side of each blower forming also one side of the blower next it, an intake common to all the blowers, a casing surrounding the blowers and forming separated compartments around the peripheries of the blowers, a discharge opening for each compartment, and means for independently closing the discharge openings.

Signed at Hartford, Connecticut, this 17th day of November, 1906.

JOHN T. AUSTIN.

Witnesses:
 CHAS. T. CORBIT,
 WM. H. HONISS.